(12) United States Patent
Rust et al.

(10) Patent No.: US 8,055,533 B2
(45) Date of Patent: Nov. 8, 2011

(54) METHOD AND APPARATUS FOR ASSIGNING MATERIAL TRANSPORT VEHICLE IDLE LOCATIONS

(75) Inventors: Katherine Kristin Rust, Austin, TX (US); Matthias Schoeps, Dresden (DE)

(73) Assignee: Advanced Micro Devices, Inc., Austin, TX (US)

(*) Notice: Subject to any disclaimer, the term of this patent is extended or adjusted under 35 U.S.C. 154(b) by 863 days.

(21) Appl. No.: 11/860,150

(22) Filed: Sep. 24, 2007

(65) Prior Publication Data

US 2009/0083091 A1    Mar. 26, 2009

(51) Int. Cl.
*G06Q 99/00* (2006.01)
(52) U.S. Cl. .................. 705/13; 705/7.11; 705/7.12
(58) Field of Classification Search ............. 705/13, 705/7.11, 7.12
See application file for complete search history.

(56) References Cited

U.S. PATENT DOCUMENTS

| | | | |
|---|---|---|---|
| 5,367,456 A * | 11/1994 | Summerville et al. ......... 701/24 |
| 2003/0050810 A1 * | 3/2003 | Larkin ............................... 705/7 |
| 2003/0069680 A1 * | 4/2003 | Cohen et al. ..................... 701/50 |
| 2003/0190223 A1 * | 10/2003 | Peiter ............................. 414/542 |
| 2004/0073448 A1 * | 4/2004 | Barts et al. ........................ 705/1 |
| 2006/0208169 A1 * | 9/2006 | Breed et al. .................... 250/221 |
| 2008/0039113 A1 * | 2/2008 | Liu et al. ..................... 455/456.1 |
| 2009/0216376 A1 * | 8/2009 | Atalla et al. .................. 700/275 |

* cited by examiner

*Primary Examiner* — Akiba Robinson Boyce
(74) *Attorney, Agent, or Firm* — Williams, Morgan & Amerson, P.C.

(57) ABSTRACT

A method for determining parking assignments for material handling vehicles in a manufacturing system is provided. The manufacturing system is operable to perform fabrication processes on a plurality of loads. The method includes identifying at least one idle material handling vehicle. A first cost factor associated with expected transit times for the at least one idle material handling vehicle to available parking locations in the manufacturing system is determined. A second cost factor based on a number of loads available to be serviced by the at least one idle material handling vehicle in the parking locations and relative priorities assigned to the loads is determined. A parking location for the at least one idle material handling vehicles is determined based on the first and second cost factors. A parking request is issued to the at least one idle material handling vehicle based on the determined parking locations.

22 Claims, 3 Drawing Sheets

METHOD AND APPARATUS FOR ASSIGNING MATERIAL TRANSPORT VEHICLE IDLE LOCATIONS

CROSS-REFERENCE TO RELATED APPLICATIONS

Not applicable.

BACKGROUND OF THE INVENTION

This disclosed subject matter pertains to automated manufacturing environments, such as semiconductor manufacturing, and, more particularly, to a method and apparatus for assigning material transport vehicle idle locations.

Growing technological requirements and the worldwide acceptance of sophisticated electronic devices have created an unprecedented demand for large-scale, complex, integrated circuits. Competition in the semiconductor industry requires that products be designed, manufactured, and marketed in the most efficient manner possible. This requires improvements in fabrication technology to keep pace with the rapid improvements in the electronics industry. Meeting these demands spawns many technological advances in materials and processing equipment and significantly increases the number of integrated circuit designs. These improvements also require effective utilization of computing resources and other highly sophisticated equipment to aid, not only design and fabrication, but also the scheduling, control, and automation of the manufacturing process.

Turning first to fabrication, integrated circuits, or microchips, are manufactured from modern semiconductor devices containing numerous structures or features, typically the size of a few micrometers or less. The features are placed in localized areas of a semiconducting substrate, and are either conductive, non-conductive, or semi-conductive (i.e., rendered conductive in defined areas with dopants). The fabrication process generally involves processing a number of wafers through a series of fabrication tools. Each fabrication tool performs one or more of four basic operations discussed more fully below. The four basic operations are performed in accordance with an overall process to finally produce the finished semiconductor devices.

Integrated circuits are manufactured from wafers of a semiconducting substrate material. Layers of materials are added, removed, and/or treated during fabrication to create the integrated, electrical circuits that make up the device. The fabrication essentially comprises the following four basic operations:

layering, or adding thin layers of various materials to a wafer from which a semiconductor is produced;
patterning, or removing selected portions of added layers;
doping, or placing specific amounts of dopants in selected portions of the wafer through openings in the added layers; and
heat treating, or heating and cooling the materials to produce desired effects in the processed wafer.

Although there are only four basic operations, they can be combined in hundreds of different ways, depending upon the particular fabrication process.

To facilitate processing of wafers through a process flow, wafers are typically grouped into lots. Each lot is housed in a common wafer carrier. Carriers are transported to various process and metrology tools throughout the fabrication facility to allow the required processes to be completed to fabricate integrated circuit devices on the wafers.

Modern wafer fabrication facilities employ automated material movement systems to satisfy ergonomic concerns and to maintain a high level of automation. An interbay/intrabay vehicle automated material handling systems may be employed to automate the transfer of wafers to the tools required in the process flow. One factor contributing to the efficiency of the material handling system is the delivery time between tools. Delivery time may vary depending on the distance between tools, the congestion of the tools, and the distance an idle material handling vehicle needs to travel to pick up a waiting wafer carrier.

The transport time between tools is relatively static under normal system conditions, but the time required to locate an idle material handling vehicle, assign it to a lot, and move the assigned vehicle to the current location of the lot (e.g., tool or intermediate storage location) can exhibit significant variability. Hence, the disposition of idle material handling vehicles throughout the fabrication facility impacts the time it takes a completed lot to transit from a current tool to the next required tool, and thus the throughput of the manufacturing system.

The determination of the appropriate parking locations for the material transport vehicles is an aspect that affects the overall efficiency of the system. However, as with other resources in the fabrication facility, the material handling capacity is relatively fixed. In determining a number of material handling vehicles to park in a given controlling area, it is necessary to attempt to provide enough vehicles to respond to transport pickup requests, but also it is not efficient to have too many idle vehicles. An excess number of idle material transport vehicles could result in additional vehicle traffic and extended delivery times, and could also cause an imbalance in the distribution of vehicles across the fabrication facility, further increasing retrieval time variability. Redistributing idle vehicles by making a significant number of parking move requests could degrade system performance by artificially increasing the vehicle utilization by tasking the vehicles with move requests.

This section of this document is intended to introduce various aspects of art that may be related to various aspects of the disclosed subject matter described and/or claimed below. This section provides background information to facilitate a better understanding of the various aspects of the disclosed subject matter. It should be understood that the statements in this section of this document are to be read in this light, and not as admissions of prior art. The disclosed subject matter is directed to overcoming, or at least reducing the effects of, one or more of the problems set forth above.

BRIEF SUMMARY OF THE INVENTION

The following presents a simplified summary of the disclosed subject matter in order to provide a basic understanding of some aspects of the disclosed subject matter. This summary is not an exhaustive overview of the disclosed subject matter. It is not intended to identify key or critical elements of the disclosed subject matter or to delineate the scope of the disclosed subject matter. Its sole purpose is to present some concepts in a simplified form as a prelude to the more detailed description that is discussed later.

One aspect of the disclosed subject matter is seen in a method for determining parking assignments for material handling vehicles in a manufacturing system. The manufacturing system is operable to perform fabrication processes on a plurality of loads. The method includes identifying at least one idle material handling vehicle. A first cost factor associated with expected transit times for the at least one idle material handling vehicle to available parking locations in the manufacturing system is determined. A second cost factor based on a number of loads available to be serviced by the at least one idle material handling vehicle in the parking locations and relative priorities assigned to the loads is determined. A parking location for the at least one idle material handling vehicles is determined based on the first and second cost factors. A parking request is issued to the at least one idle material handling vehicle based on the determined parking locations.

Another aspect of the disclosed subject matter is seen in a system including a plurality of control areas for performing fabrication processes on a plurality of loads, a plurality of material handling vehicles for moving the loads, and a material handling controller. The material handling controller is operable to identify at least one idle material handling vehicle, determine a first cost factor associated with expected transit times for the at least one idle material handling vehicle to available parking locations in the control areas; determine a second cost factor based on a number of loads available to be serviced by the at least one idle material handling vehicle in the control areas and relative priorities assigned to the loads, determine a parking location in the control areas for the at least one idle material handling vehicle based on the first and second cost factors, and issue a parking request to the at least one idle material handling vehicle based on the determined parking locations.

BRIEF DESCRIPTION OF THE SEVERAL VIEWS OF THE DRAWINGS

The disclosed subject matter will hereafter be described with reference to the accompanying drawings, wherein like reference numerals denote like elements, and.

Figure 1:
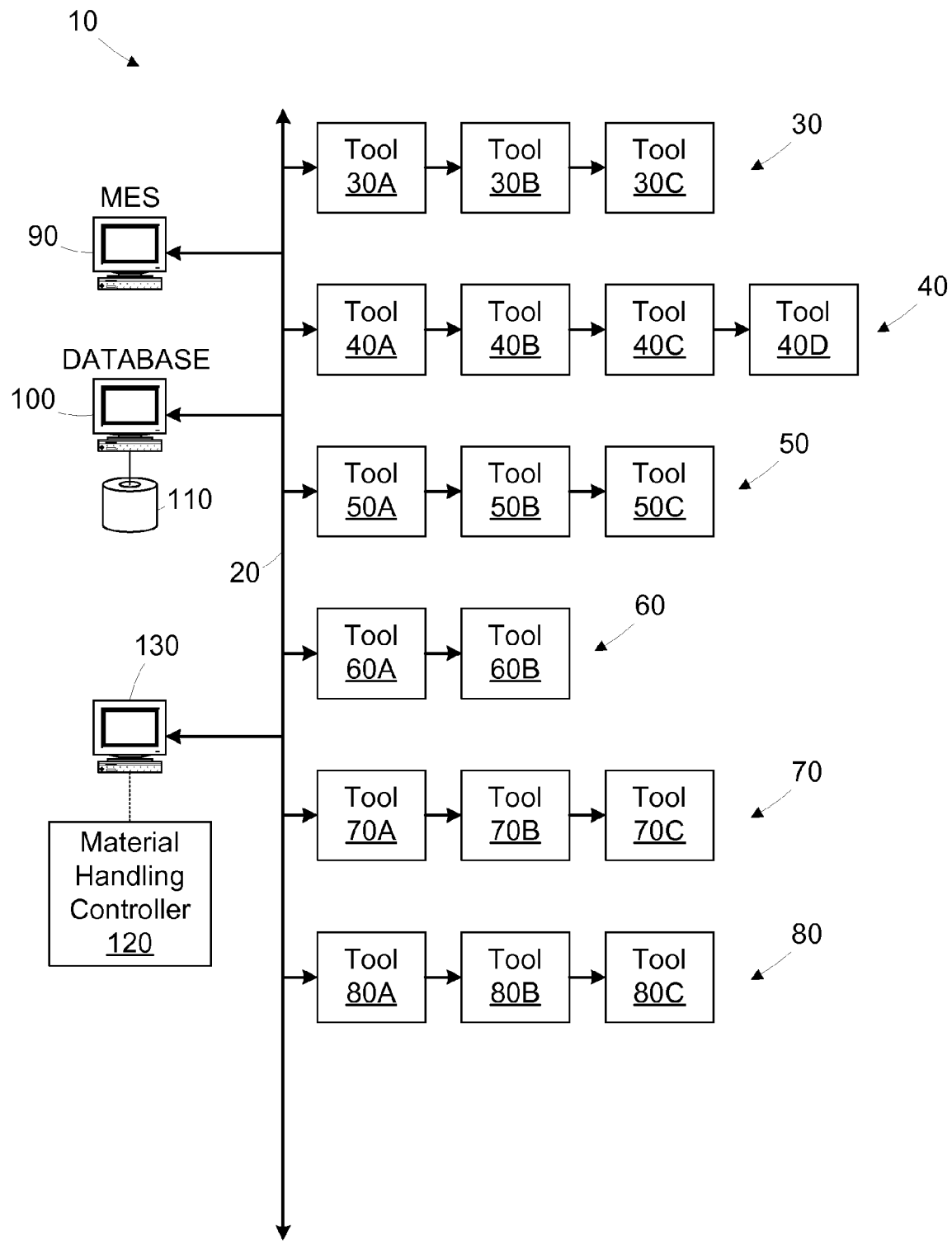
FIG. 1 is a simplified block diagram of a manufacturing system.

While the disclosed subject matter is susceptible to various modifications and alternative forms, specific embodiments thereof have been shown by way of example in the drawings and are herein described in detail. It should be understood, however, that the description herein of specific embodiments is not intended to limit the disclosed subject matter to the particular forms disclosed, but on the contrary, the intention is to cover all modifications, equivalents, and alternatives falling within the spirit and scope of the disclosed subject matter as defined by the appended claims.

DETAILED DESCRIPTION OF THE INVENTION

One or more specific embodiments of the disclosed subject matter will be described below. It is specifically intended that the disclosed subject matter not be limited to the embodiments and illustrations contained herein, but include modified forms of those embodiments including portions of the embodiments and combinations of elements of different embodiments as come within the scope of the following claims. It should be appreciated that in the development of any such actual implementation, as in any engineering or design project, numerous implementation-specific decisions must be made to achieve the developers' specific goals, such as compliance with system-related and business related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure. Nothing in this application is considered critical or essential to the disclosed subject matter unless explicitly indicated as being "critical" or "essential."

The disclosed subject matter will now be described with reference to the attached figures. Various structures, systems and devices are schematically depicted in the drawings for purposes of explanation only and so as to not obscure the disclosed subject matter with details that are well known to those skilled in the art. Nevertheless, the attached drawings are included to describe and explain illustrative examples of the disclosed subject matter. The words and phrases used herein should be understood and interpreted to have a meaning consistent with the understanding of those words and phrases by those skilled in the relevant art. No special definition of a term or phrase, i.e., a definition that is different from the ordinary and customary meaning as understood by those skilled in the art, is intended to be implied by consistent usage of the term or phrase herein. To the extent that a term or phrase is intended to have a special meaning, i.e., a meaning other than that understood by skilled artisans, such a special definition will be expressly set forth in the specification in a definitional manner that directly and unequivocally provides the special definition for the term or phrase.

Referring now to the drawings wherein like reference numbers correspond to similar components throughout the several views and, specifically, referring to FIG. 1, the disclosed subject matter shall be described in the context of an illustrative manufacturing system 10. The manufacturing system 10 includes a network 20, a plurality of tools 30-80, a manufacturing execution system (MES) server 90, a database server 100 and its associated data store 110, and a material handling controller 120 executing on a workstation 130.

In the illustrated embodiment, the manufacturing system 10 is adapted to fabricate semiconductor devices. Although the disclosed subject matter is described as it may be implemented in a semiconductor fabrication facility, the subject matter is not so limited and may be applied to other manufacturing environments. The techniques described herein may be applied to a variety of workpieces or manufactured items, including, but not limited to, microprocessors, memory devices, digital signal processors, application specific integrated circuits (ASICs), or other devices. The techniques may also be applied to workpieces or manufactured items other than semiconductor devices.

Portions of the detailed description are presented in terms of software, or algorithms and symbolic representations of operations on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

The network 20 interconnects various components of the manufacturing system 10, allowing them to exchange information. Each of the tools 30-80 may be coupled to a computer (not shown) for interfacing with the network 20. The tools 30-80 are grouped into sets of like tools, as denoted by lettered suffixes. For example, the set of tools 30A-30C represent tools of a certain type, such as a chemical mechanical planarization (CMP) tool.

A particular wafer or lot of wafers progresses through the tools 30-80 as it is being manufactured, with each tool 30-80 performing a specific function in the process flow. Exemplary processing tools for a semiconductor device fabrication environment include metrology tools, photolithography steppers, etch tools, deposition tools, polishing tools, rapid thermal processing tools, implantation tools, etc. The tools 30-80 are illustrated in a rank and file grouping for illustrative purposes only. In an actual implementation, the tools 30-80 may be arranged in any physical order or grouping. Additionally, the connections between the tools in a particular grouping are meant to represent connections to the network 20, rather than interconnections between the tools 30-80.

The manufacturing execution system (MES) server 90 directs the high level operation of the manufacturing system 10. The MES server 90 monitors the status of the various entities in the manufacturing system 10 (i.e., lots, tools 30-80) and controls the flow of articles of manufacture (e.g., lots of semiconductor wafers) through the process flow. The database server 100 stores data related to the status of the various entities and articles of manufacture in the process flow using one or more data stores 110. The data may include pre-process and post-process metrology data, tool states, lot priorities, etc.

The MES server 90 stores information in the data store 110 related to the particular tools 30-80 (i.e., or sensors (not shown) associated with the tools 30-80) used to process each lot of wafers. As metrology data is collected related to the lot, the metrology data and a tool identifier indicating the identity of the metrology tool recording the measurements is also stored in the data store 110. The metrology data may include feature measurements, process layer thicknesses, electrical performance, surface profiles, etc. Data stored for the tools 30-80 may include chamber pressure, chamber temperature, anneal time, implant dose, implant energy, plasma energy, processing time, etc. Data associated with the operating recipe settings used by the tool 30-80 during the fabrication process may also be stored in the data store 110. For example, it may not be possible to measure direct values for some process parameters. These settings may be determined from the operating recipe in lieu of actual process data from the tool 30-80.

The distribution of the processing and data storage functions amongst the different computers 90, 100, 130 is generally conducted to provide independence and a central information store. Of course, different numbers of computers and different arrangements may be used. Moreover, the functions of some units may be combined. For example, the MES server 90 and the material handling controller 120 may be combined into a single unit.

Figure 2:
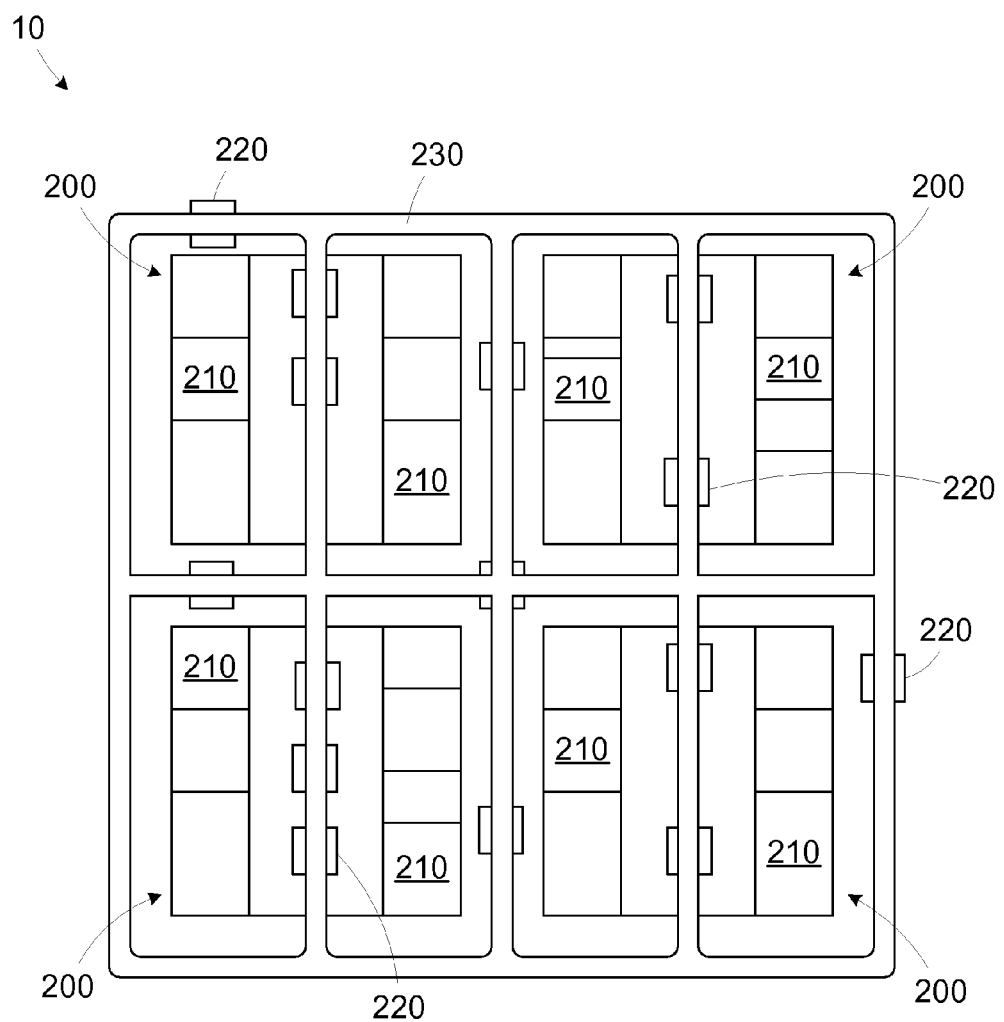
FIG. 2 is a simplified layout diagram of the manufacturing system.

As will be described in greater detail below, the material handling controller 120 determines the allocation of material handling resources throughout the fabrication facility. FIG. 2 illustrates a simplified layout diagram of the manufacturing system 10. The layout diagram is not intended to reflect an actual physical diagram of the layout, but rather a reduced scope conceptual diagram used in illustrating the techniques described herein. The manufacturing system 10 includes a plurality of control areas 200, sometimes referred to as bays. In FIG. 2, four control areas are illustrated, however, in actual fabrication facility, many more control areas (e.g., 20-30) would be present. Each control area includes a plurality of tools 210 (e.g., the tools 30-80) of FIG. 1. The particular tools 210 selected for each control area 200 may vary depending on the organization of the fabrication facility. In one example, tools in a common tool family may be grouped in common control areas 200. Hence, photolithography tools may be located in one control area 200, while etch tools may be located in another control area 200. In another example, the tools 210 may be grouped by process layer. Hence, the tools required to form a particular layer (i.e., starting with a photolithography step and terminating prior to the next photolithography step) may be grouped into a common control area 200.

In the system 10 of FIG. 2, material handling vehicles 220 are provided for moving wafer carriers to tools 210 within a control area (i.e., intrabay moves) or between different control areas (i.e., interbay moves). The number of material handling vehicles 220 may vary depending on the particular implementation. In the illustrated embodiment, an overhead transit framework 230 is provided. The material handling vehicles 220 are suspended from the framework 230 as they transit the system 10. However, it should be understood that the present subject matter is not limited to use with vehicles that are suspended from such a framework. Rather, the present subject matter may be employed with any type of material handling system that employs vehicles to deliver work pieces to a tool or location.

In the illustrated embodiment, the material handling controller 120 implements a model-based approach to assign parking locations for idle material handling vehicles 220. The following technique assumes a parking location is given to an idle vehicle 220 without creating specific assignments linking a particular vehicle 220 to a load pickup request. In this manner, any immediate load pickup request may be assigned to the closest vehicle 220 in a control area 200. Also, since future load pickup requests are considered, the appropriate number of vehicles 220 may have time to travel to the control area 200 (i.e., assigned parking locations within the control area 200). The number of parking positions assigned within a control area 200 is based on current state conditions of the manufacturing system 10. These state conditions may be provided by the MES server 90 and/or the material handling controller 120 and may include, in one illustrated embodiment, the number of loads processing, the estimated time before a load pickup request is expected to be generated, load processing priorities, and vehicle 220 position/availability.

The material handling controller 120 seeks to optimize the number of idle vehicles 220 assigned to park in each control area 200, such that the vehicles 220 are distributed in control areas 200 where high priority requests and more vehicle retrieval requests are expected. The number of loads in a control area 200, the remaining processing times of the loads, the specified load priorities, the load distance to idle vehicles 220, the current parking status of vehicles 220, the required retrieval time for moves, and the delivery time (i.e., including delivery time variability) per destination control area 200 of loaded vehicles 220 are used as weights. Factors based on these weights (referred to as cost factors) are then assigned to each parking request in an objective function. As stated above, while a cost factor is given to each parking request based on load request information, parking vehicles 220 are not reserved to a particular load request, thus easing the problem constraints and increasing the robustness solution.

The objective function employed by the material handling controller 120 seeks to optimize the total number of parking vehicles 220 per control area 200 by using cost factors to prioritize parking locations without violating the defined constraints. The impact of these cost factors is given a weight based on the problem objective. The problem constraints considered are the total number of vehicles 220 available for parking, the lower and upper bounds for the number of vehicles 220 in a control area 200, the lower target priority parameter for minimizing vehicle travel time, the time window for lot availability consideration, and defined parameters used to update the cost factors.

The material handling controller 120 of FIG. 1 employs a linear mixed-integer programming model for assigning material handling vehicle 220 parking locations. In such an optimization based approach, solutions are driven by a plurality of objectives. Constraints are defined that serve as conditions to narrow down the solution scope. With a commercially or publicly available solver, a linear (i.e., either integer or non-integer) solution can be identified within the solution scope. For example, the OSL solver offered by IBM, Corporation is a commercially available software tool that may be used. For purposes of the following description, the following notation list provided in Table 1 identifies symbols used in the following objective and constraint equations.

TABLE 1

Notation

| Set | |
|---|---|
| Γ | Set of idle vehicles in the system |
| Γ' | Set of non-idle vehicles in the system |
| Λ | Set of control areas accessible by vehicles i∈ {Γ∩Γ'} |
| Ψ$_j$ | Set of parking locations in control area j∈ Λ |
| Θ | Set of time periods (e.g., shift, day, or week) |
| Θ$^c$ | Continuous set of Θ |
| P | Set of priority levels |
| Parameters | |
| v$_j$ | Minimum number of vehicles ∈ {Γ∩Γ'} ∀ control area j∈ Λ |
| V$_j$ | Maximum number of vehicles ∈ {Γ∩Γ'} ∀ control area c |
| l$_{pj}$ | Number of lots of priority p available for pickup before time T ∀ control area j∈ Λ |
| W$_k$ | Weight given to cost factor (C$_k$) |
| w$_p$ | Weight given to lot priority p ∈ P |
| t$_p$ | Target vehicle assignment value for lot priority p∈ P |
| x'$_j$ | Number of non idle vehicles whose destination is control area j where control area j∈ Λ  t∈ Θ$^c$ |
| Variables | |
| δ$_l$ | Expected time before lot I available for pickup  t∈ Θ$^c$ |
| η$_{ij}$ | Expected travel time to control area j from the current vehicle location ∀ control area j∈ Λ, i∈ Γ  t∈ Θ |
| σ$_{ij}$ | Standard deviation of expected travel time to control area j∈ Λ ∀ vehicles i∈ Γ  t∈ Θ |
| x$_{ij}$ | Binary decision variable designating vehicle i traveling to park in control area j ∀ control area j∈ Λ, i∈Γ |

The material handling controller 120 employs a plurality of cost factors. A first cost factor attempts to minimize the total travel time for a parking vehicle 220.

$$C_{1i} : \eta_{ij} \Big/ \sum_{i \in \Gamma} \eta_{ij} \qquad (1)$$

The first cost factor assigns a cost to the travel time by dividing the travel time to a particular control area by the sum of the travel times to each control area. This cost factor tends to favor the control area closest to the current location of the vehicle 220.

A second cost factor attempts to maximize the total number of vehicles 220 assigned to control areas 200 with high priority loads. Lot priority assignments are made by assigning a weight factor to a group of lots. A higher lot priority corresponds to a higher weight.

$$C_{2pj} : w_p l_{pj} \Big/ \sum_{j \in \Lambda} l_{pj} \qquad (2)$$

The second cost factor relates the weight associated with a particular priority and the number of lots in a particular control area to the sum of the lots of that priority in all of the control areas.

A third cost factor attempts to favor the choice of a parking location with lower travel time variability for the expected route from the vehicle's current location. Control areas with higher travel time variability tend to correspond to locations with more congestion or more complicated transit routes. By choosing a location with lower variability, the likelihood that the vehicle 220 will arrive by the time it is needed is increased.

$$C_{3i} : \sigma_{ij} \Big/ \sum_{i \in \Gamma} \sigma_{ij} \qquad (3)$$

The objective function employed by the material handling controller 120 is:

$$\mathrm{Min}\left\{\sum_{j \in \Lambda}\left[W_1 \sum_{i \in \Gamma} x_{ij} C_{1i} - W_2 \sum_{p \in P}\left[C_{2pj} \sum_{i \in \Gamma} x_{ij} - x'_j\right] + W_3 \sum_{i \in \Gamma} x_{ij} C_{3i}\right]\right\} \qquad (4)$$

Essentially, the objective function seeks to minimize the total cost, as defined by the cost factors defined in Equations 1-3. In particular, the objective functions seeks to minimize the travel time (i.e., $C_1$) and the transit time variability (i.e., $C_3$) while maximizing the number of vehicles 220 provided for high priority lots (i.e., $C_2$). Each cost factor is given a weight depending on its overall importance. The particular values of the weight factors may vary depending on the particular embodiment, and may be determined by experimentation or simulation.

The following constraints are defined for the optimization to limit the solution scope of the objective function.

Only lots available in a specified time window are considered:

$$\delta_l <= T \qquad (5)$$

Priority lots are serviced by vehicles 220 in close proximity. A target threshold is specified by priority level. Vehicles 220 in the control area 200 are considered to minimize control area traffic.

$$\sum_j \left[ \left[ \left( \sum_i \eta_{ij} x_{ij} \Big/ \sum_i x_{ij} \right) - \delta_{1_{pj}} \right] * x'_j / l_{pj} \right] \geq t_p \quad (6)$$

$$\forall\, p \in P$$

This constraint uses a weighted average of the expected travel times for all vehicles 220 assigned to travel to the control area. The number of non-idle vehicles destined for the control area and the lot priorities are also factored in to attempt to meet the specified target number vehicles 220 for a given priority.

To attempt to balance the distribution of vehicles 220 throughout the manufacturing system 10, constraints are provided regarding the minimum number of total vehicles 220 per control area 200 and the maximum number of total vehicles 220 per control area 200.

$$\sum_{i \in \{\Gamma \cap \Gamma'\}} x_{ij} \geq v_j \;\; \forall\, \text{control area}\; j \in \Lambda \quad (7)$$

$$\sum_{i \in \{\Gamma \cap \Gamma'\}} x_{ij} \leq V_j \;\; \forall\, \text{control area}\; j \in \Lambda \quad (8)$$

The following constraint ensures that idle vehicles are assigned to park in only one control area.

$$\sum_{j \in \Lambda} x_{ij} = 1 \;\; \forall\, i \in \Gamma \quad (9)$$

The final constraint specifies that the binary decision variable designating vehicle i traveling to park in control area j can only have a value of 0 or 1.

$$x_{ij} \in \{0,1\} \quad (10)$$

The material handling controller 120 performs the optimization process when one or more material handling vehicles 220 become idle. The output of the optimization is a set of parking assignments for the idle vehicles 220. The material handling controller 120 or MES server 90 issues parking requests to each of the idle vehicles 220.

The issuing of parking requests by the material handling controller 120 is independent of the dispatching rules applied for servicing available loads. Various load dispatching algorithms may be employed, and for clarity and ease of illustration these dispatching rules are not described in detail herein. Generally, dispatch rules are followed when a load requires servicing. One of the available idle vehicles 220 is then assigned to service the load. In some embodiments, dispatch requests may interrupt in-progress parking requests.

Figure 3:
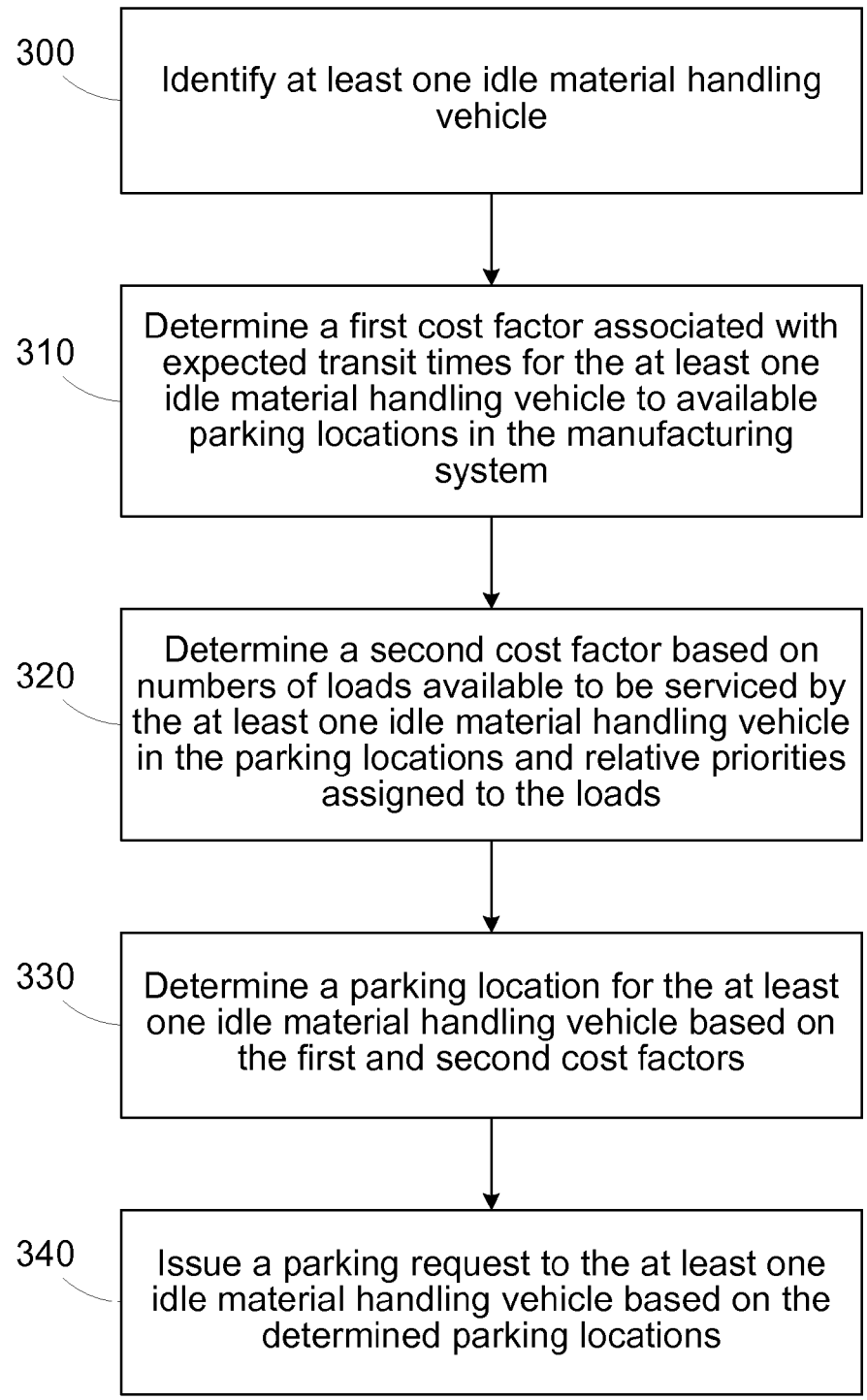
FIG. 3 is a simplified flow diagram of a method for determining parking assignments for material handling vehicles in a manufacturing system.

FIG. 3 shows a simplified flow diagram of a method for determining parking assignments for material handling vehicles in a manufacturing system. In method block 300, idle material handling vehicles are identified. In method block 310, a first cost factor associated with expected transit times for the idle material handling vehicles to available parking locations in the manufacturing system is determined. In method block 320, a second cost factor based on numbers of loads available to be serviced by the idle material handling vehicles in the parking locations and relative priorities assigned to the loads is determined. In method block 330, parking locations for the idle material handling vehicles are determined based on the first and second cost factors. In method block 340, parking requests are issued to at least a subset of the idle material handling vehicles based on the determined parking locations.

The particular embodiments disclosed above are illustrative only, as the disclosed subject matter may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the disclosed subject matter. Accordingly, the protection sought herein is as set forth in the claims below.

We claim:

1. A method for determining parking assignments for material handling vehicles in a manufacturing system, the manufacturing system being operable to perform fabrication processes on a plurality of loads, the method comprising:
   identifying in at least one computing device at least one idle material handling vehicle;
   determining in the at least one computing device a first cost factor associated with expected transit times for the idle material handling vehicle to available parking locations in the manufacturing system;
   determining in the at least one computing device a second cost factor based on a number of loads available to be serviced by the at least one idle material handling vehicle in the parking locations and relative priorities assigned to the loads;
   determining in the at least one computing device a parking location for the at least one idle material handling vehicle based on the first and second cost factors; and
   issuing a parking request in the at least one computing device to the at least one idle material handling vehicle based on the determined parking location.

2. The method of claim 1, wherein determining the parking locations further comprises employing an objective function that seeks to minimize the first cost factor and maximize the second cost factor.

3. The method of claim 2, further comprising weighting the first and second cost factors.

4. The method of claim 2, further comprising employing the objective function subject to a first constraint defining a maximum number of material transport vehicles assignable to particular parking locations and a second constraint defining a minimum number of material transport vehicles assignable to the particular parking locations.

5. The method of claim 2, further comprising employing the objective function subject to a first constraint that considers numbers of non-idle material transport vehicles destined for the parking locations.

6. The method of claim 5, further comprising employing the objective function subject to a second constraint defining a maximum number of material transport vehicles assignable to particular parking locations and a third constraint defining a minimum number of material transport vehicles assignable to the particular parking locations.

7. The method of claim 1, wherein the manufacturing system is organized into a plurality of control areas, and the parking locations correspond to selected ones of the control areas.

8. The method of claim 1, further comprising:
   determining a third cost factor associated with variabilities in the expected transit times; and determining the parking location for the at least one idle material handling vehicle based on the first, second, and third cost factors.

9. The method of claim 8, further comprising employing an objective function that seeks to minimize the first and third cost factors and maximize the second cost factor.

10. The method of claim 9, further comprising weighting the first, second, and third cost factors.

11. A method for determining parking assignments for material handling vehicles in a manufacturing system, the manufacturing system being operable to perform fabrication processes on a plurality of loads, the method comprising:
   identifying in at least one computing device at least one idle material handling vehicle;
   determining in the at least one computing device a first cost factor associated with expected transit times for the at least one idle material handling vehicle to available parking locations in the manufacturing system;
   determining in the at least one computing device a second cost factor based on a number of loads available to be serviced by the at least one idle material handling vehicle in the parking locations and relative priorities assigned to the loads;
   determining in the at least one computing device a third cost factor associated with variabilities in the expected transit times;
   employing in the at least one computing device an objective function that seeks to minimize the first and third cost factors and maximize the second cost factor to determine a parking location for the at least one idle material handling vehicle based on the first, second, and third cost factors subject to a plurality of constraints, the constraints including a first constraint that considers numbers of non-idle material transport vehicles destined for the parking locations, a second constraint defining a maximum number of material transport vehicles assignable to particular parking locations, and a third constraint defining a minimum number of material transport vehicles assignable to the particular parking locations; and
   issuing in the at least one computing device a parking request to the at least one idle material handling vehicle based on the determined parking location.

12. The method of claim 11, further comprising weighting the first, second, and third cost factors.

13. The method of claim 11, wherein the manufacturing system is organized into a plurality of control areas, and the parking locations correspond to selected ones of the control areas.

14. A system, comprising:
   a plurality of control areas for performing fabrication processes on a plurality of loads;
   a plurality of material handling vehicles for moving the loads;
   a material handling controller operable to identify at least one idle material handling vehicle, determine a first cost factor associated with expected transit times for the at least one idle material handling vehicle to available parking locations in the control areas; determine a second cost factor based on a number of loads available to be serviced by the at least one idle material handling vehicle in the control areas and relative priorities assigned to the loads, determine a parking location in one of the control areas for the at least one idle material handling vehicle based on the first and second cost factors, and issue a parking request to the at least one idle material handling vehicle based on the determined parking location.

15. The system of claim 14, wherein the material handling controller is operable to determine the parking location by employing an objective function that seeks to minimize the first cost factor and maximize the second cost factor.

16. The system of claim 15, wherein the material handling controller is operable to weight the first and second cost factors.

17. The system of claim 15, wherein the material handling controller is operable to employ the objective function subject to a first constraint defining a maximum number of material transport vehicles assignable to particular parking locations and a second constraint defining a minimum number of material transport vehicles assignable to the particular parking locations.

18. The system of claim 15, wherein the material handling controller is operable to employ the objective function subject to a first constraint that considers numbers of non-idle material transport vehicles destined for the control areas.

19. The system of claim 18, wherein the material handling controller is operable to employ the objective function subject to a second constraint defining a maximum number of material transport vehicles assignable to particular parking locations and a third constraint defining a minimum number of material transport vehicles assignable to the particular parking locations.

20. The system of claim 14, wherein the material handling controller is operable to determine a third cost factor associated with variabilities in the expected transit times and determine the parking location for the at least one idle material handling vehicle based on the first, second, and third cost factors.

21. The system of claim 20, wherein the material handling controller is operable to employ an objective function that seeks to minimize the first and third cost factors and maximize the second cost factor.

22. The system of claim 21, wherein the material handling controller is operable to weight the first, second, and third cost factors.

* * * * *